Jan. 30, 1951 G. E. CRIM ET AL 2,539,403
FLOATING MARKER FOR FISHING NETS AND THE LIKE
Filed Oct. 7, 1947 2 Sheets-Sheet 1
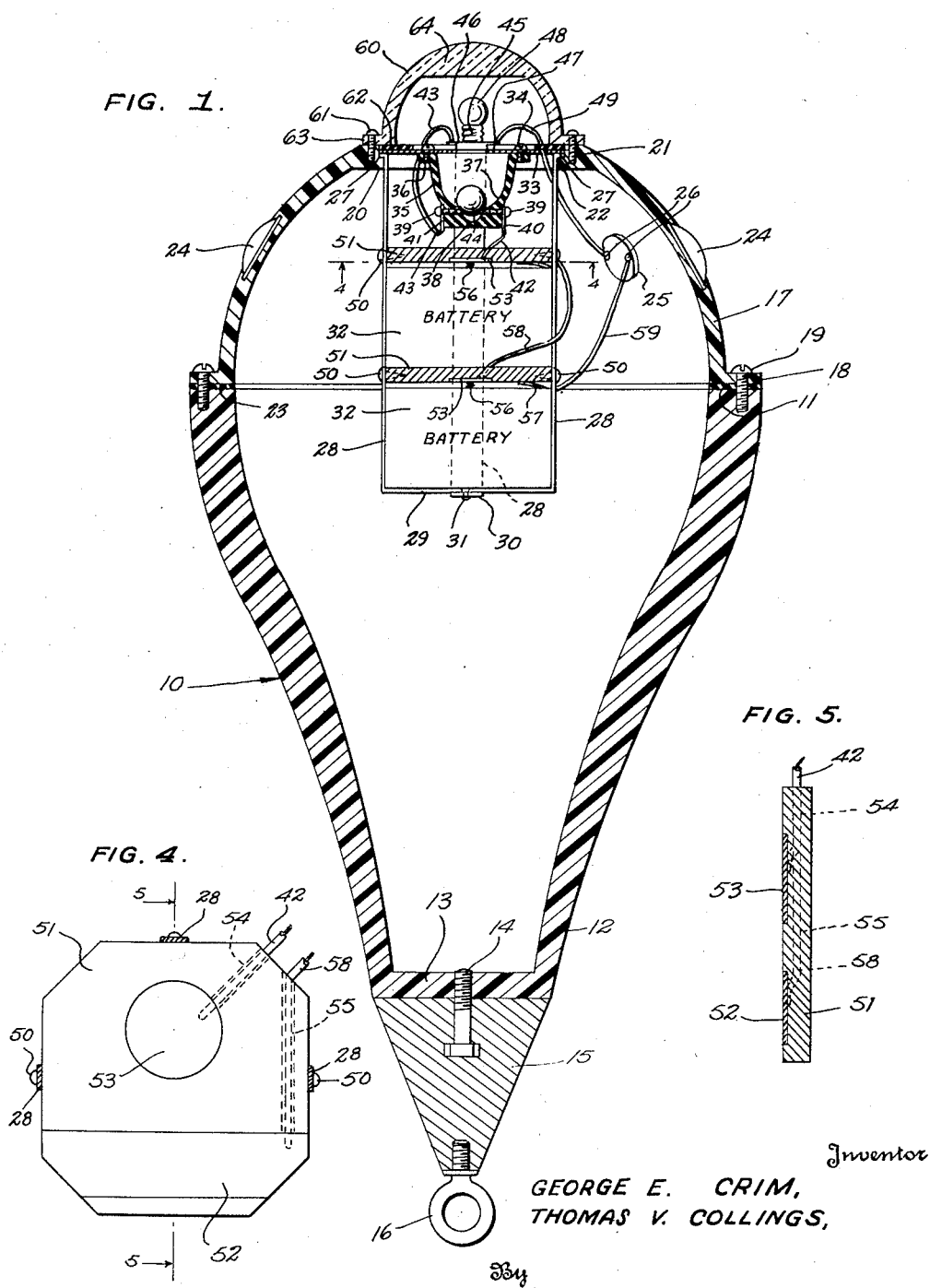
Inventor
GEORGE E. CRIM,
THOMAS V. COLLINGS,
By McMorrow, Berman & Davidson
Attorneys Jan. 30, 1951   G. E. CRIM ET AL   2,539,403
FLOATING MARKER FOR FISHING NETS AND THE LIKE
Filed Oct. 7, 1947   2 Sheets-Sheet 2
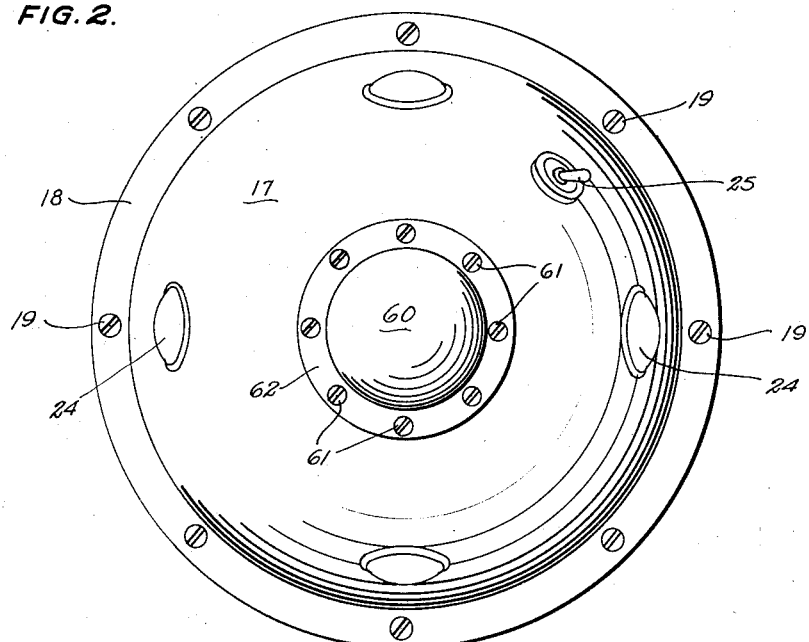
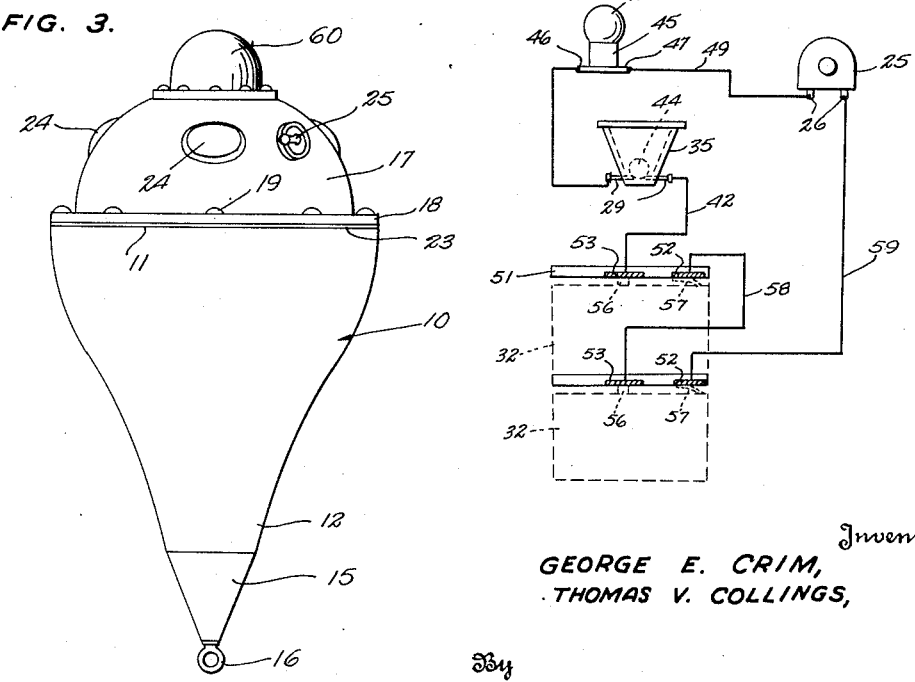
GEORGE E. CRIM,
THOMAS V. COLLINGS,
Inventor Patented Jan. 30, 1951

2,539,403

UNITED STATES PATENT OFFICE 2,539,403

FLOATING MARKER FOR FISHING NETS AND THE LIKE

George E. Crim and Thomas Victor Collings, Miami, Fla.

Application October 7, 1947, Serial No. 778,386

2 Claims. (Cl. 9—8.3)

This invention relates to floating markers, and more particularly to floating markers for fishing nets.

It is an object of the invention to provide a floating marker or buoy for fishing nets, such marker including illuminating means.

A further object is to provide a floating marker which will normally remain upright in the water, and having a switch actuated by the motion of the water to cause a light to blink.

A still further object of the invention is to provide a device of the above mentioned class which is simplified in construction, reliable and efficient in operation, and inexpensive to manufacture.

Other objects and advantages of the invention will be apparent during the course of the following description.

In the accompanying drawings, forming a part of the application, and in which like numerals are employed to designate like parts throughout the same, Figure 1 is a central vertical section through the floating marker embodying the invention, Figure 2 is a plan view of the same, Figure 3 is a side elevation of the marker, drawn on a reduced scale, Figure 4 is a horizontal section on line 4—4 of Figure 1, parts omitted, Figure 5 is a vertical section on line 5—5 of Figure 4, and, Figure 6 is a view, partly diagrammatic, showing the electric circuit involved in the device.

In the drawings, where for the purpose of illustration is shown a preferred example of the invention, the numeral 10 designates a lower casing section or shell preferably formed of a suitable opaque plastics material. The casing section 10 is circular in transverse cross section, and is open at its top, adjacent to its top annular end 11. The casing section 10 includes a depending portion 12 of reduced diameter, and a bottom end 13, integral therewith. Rigidly secured to the bottom end 13, by means of a stud 14, or the like, is a conical sinker or weight 15, formed of lead, or the like. The weight 15 carries a depending loop or eye 16, for securing the marker to a fishing net, or the like, not shown.

Mounted upon the end 11 of the lower casing section is a top casing section or shell 17, which is preferably spherically curved, and formed of opaque plastics material. This top casing section 17 includes a bottom annular radially projecting flange 18, rigidly mounted upon the end 11, by means of screws 19, or the like. The casing section 17 also includes a flat top or end 20, having a central circular opening 21, provided with an annular shoulder or seat 22. A water-tight gasket 23 is provided between the flange 18 and end 11. The external surface of the top casing section 17 may be coated with a luminous material to facilitate seeing the marker at night. Reflecting buttons or discs 24 may be mounted upon the casing section 17 for reflecting light at night, to further facilitate seeing the marker. A manual switch 25 is mounted upon the top casing section 17, and the terminals 26 of this switch extend into the top casing section for connection in an electric circuit.

Seated upon the shoulder 22 are short lateral extensions or tabs 27, formed upon the tops of three upstanding frame members or legs 28. The two opposite legs 28, in Figure 1, have a bottom strip 29, integral therewith, and forming a U-shaped support. The other leg 28, shown dotted in Figure 1, has a bottom right angle strip or extension 30 connected to the strip 29, as at 31. The legs 28 and bottom strips 29 and 30 constitute a cage for suitable batteries 32, supported therein. A circular plate 33 is disposed within the opening 21, and is suitably rigidly connected to the tabs 27.

Rigidly connected to the plate 33, by means of screws 34, and disposed at the center of the plate and depending therefrom is a gravity operated switch housing or support 35, formed of electrical insulating material or plastics. The housing has a top annular flange 36 to receive the screws 34, and is provided with a main recess 37, spherically curved at its bottom, and having a bottom central small spherically curved recess 38. The housing 35 is supported by the plate 33, and is disposed centrally within the legs 28 of the battery cage. The lower end of the housing 35 is disposed above the top battery 32, as shown. The lower end of the housing 35 carries transversely disposed terminal screws 39, beneath the heads of which are clamped terminal lugs 40 and 41 of wires 42 and 43, respectively. A steel ball 44 is freely disposed within the recess 37 and adapted to project slightly into the recess 38 to engage the inner ends of the terminal screws 39, which project into the bottom recess 38. The ball 44 makes electrical contact with the inner ends of the screws 39, and with the same constitutes a gravity switch, actuated by the motion of the water in which the marker floats.

Disposed upon the top side of the plate 33, and rigidly mounted thereon, is an electric light bulb socket 45 including terminals 46 and 47, and receiving a light bulb 48 therein. The wire 43 is electrically connected to the terminal 46, as shown. The terminal 47 is connected to a wire 49, connected to one terminal 26 of the manual switch 25.

Disposed above the top battery 32 and connected to the legs 28, by means of screws 50, is an insulating spacer or disc 51, preferably formed of wood, or the like. An identical spacer 51 is disposed between the batteries 32, and also secured to the arms 28. Each insulating spacer has mounted upon its bottom surface a conducting strip 52 and a conducting button or disc 53, insulated from the strip 52. Each spacer 51 is square with its corners removed, as shown. The strip 52 is disposed near one side of the spacer, and the disc 53 is near its center. The strip 52 and disc 53 are recessed into the bottom of the spacer 51, and are flush with such bottom. Horizontal passages 54 and 55 are provided in one of the corners of each spacer 51, and these passages lead to the disc 53 and strips 52, respectively, Figure 4. Each battery 32 has a positive terminal 56 and a negative terminal 57, as shown. The spacers 51 are so disposed, that each positive battery terminal makes electrical contact against the disc 53 of the adjacent spacer. Each negative terminal 57 makes electrical contact with the strip 52 of the adjacent spacer 51. The wire 42 extends into the passage 54 of the top spacer 51, is electrically connected to the disc 53 thereof. A wire 58 is connected with the strip 52 of the top spacer 51, and through the passage 55 thereof, and is connected to the disc 53 of the lower spacer 51. A wire 59 is connected to the strip 52 of the bottom spacer 51 and leads to the other terminal 26 of the manual switch 25.

A spherically curved translucent dome 60 is mounted upon the flat top 20 of the upper casing section 17, and is secured in place by means of screws 61, or the like. A water-tight gasket 62 is arranged between the flange 63 of the dome and the plate 33. The dome 60 has a thickened top portion 64 which is a magnifier, and makes the light from the bulb 48 appear magnified.

In use, one or more of the floating markers are secured to a fisherman's net, or the like, and allowed to float in the water. The markers will tend to stay upright, due to the weight 15. The manual switch 25 is closed. Current will flow from the batteries 32, which are connected in series, through the wire 42, terminal screws 29 and ball 44, wire 43, bulb terminals 46 and 47, wire 49, terminals 26 of manual switch 25, wire 59, strip 52 of lower spacer 51, negative terminal 57 of lower battery 32, positive terminal 56 of such battery, disc 53 of lower spacer 51, wire 58, strip 52 of upper spacer 51, negative terminal 57 of upper battery 32, positive terminal 56 of such battery, and through the disc 53 of the upper spacer 51. The light bulb 48 will continue to glow until the motion of the water unseats the contact ball 44. When this occurs, the ball 44 disengages the terminal screws 29, thus momentarily opening the circuit. The light bulb 48 will blink off and on as this action occurs repeatedly. The arrangement of the contact ball 44 within the recess 37 is such, that a relatively slight rocking will unseat the ball and cause the light to blink. This blinking, rather than a continuous glowing of the bulb 48, prolongs the life of the batteries 32.

It is to be understood that the form of our invention, herewith shown and described, is to be taken as a preferred example of the same, and that various changes in the shape, size and arrangement of parts may be resorted to, without departing from the spirit of the invention, or the scope of the subjoined claims.

What is claimed is:

1. A floating marker for fishing nets and the like, comprising a downwardly tapered lower casing section, a weight arranged beneath and secured to the lower end of the lower casing section, an upwardly tapering upper casing section having its lower large end removably mounted upon the upper large end of the lower casing section, a supporting frame disposed within the upper casing section and having its upper end mounted upon the upper end of the upper casing section, the frame having its lower end terminating near the upper end of the lower casing section, a plurality of batteries mounted within the frame, an insulating receptacle mounted within the frame above the batteries, contacts mounted within the lower portion of the insulating receptacle and projecting into the same, a rolling contact within the receptacle, a transparent dome mounted upon the top of the upper casing section and covering the frame, an electric bulb mounted upon the upper casing section and disposed within the dome, and an electric circuit connecting the batteries, contacts and bulb.

2. A floating marker for fishing nets and the like, comprising a downwardly tapered lower casing section having an upper large end, a weight arranged beneath and secured to the lower end of the lower casing section, an upwardly tapering upper casing section having a lower large end removably mounted upon said upper large end, a supporting frame mounted within the upper casing section and having one side open, said supporting frame having its upper end mounted upon the upper end of the upper casing section, the frame having its lower end terminating near the lower end of the upper casing section, a plurality of batteries disposed in superposed relation within the supporting frame and movable through the open side of the supporting frame, said batteries having terminals, insulating plates disposed adjacent to the upper ends of the batteries within the frame and having contact elements to engage with the terminals of the batteries, the plates being movable through the open side of the frame, a gravity operated switch device arranged within the upper end of the frame and mounted upon the upper casing section and including contacts and a rolling contact member, an electric bulb mounted upon the upper casing section above and adjacent to the gravity operated switch device, a transparent dome mounted upon the upper casing section and enclosing the bulb, and a circuit connected with the contact elements, contacts, and a bulb.

GEORGE E. CRIM.
THOMAS VICTOR COLLINGS.

REFERENCES CITED

The following references are of record in the file of this patent:

UNITED STATES PATENTS

| Number | Name | Date |
|---|---|---|
| 2,151,938 | Ramsey et al. | Mar. 28, 1939 |
| 2,404,681 | Baack | July 23, 1946 |